United States Patent Office 3,457,157
Patented July 22, 1969

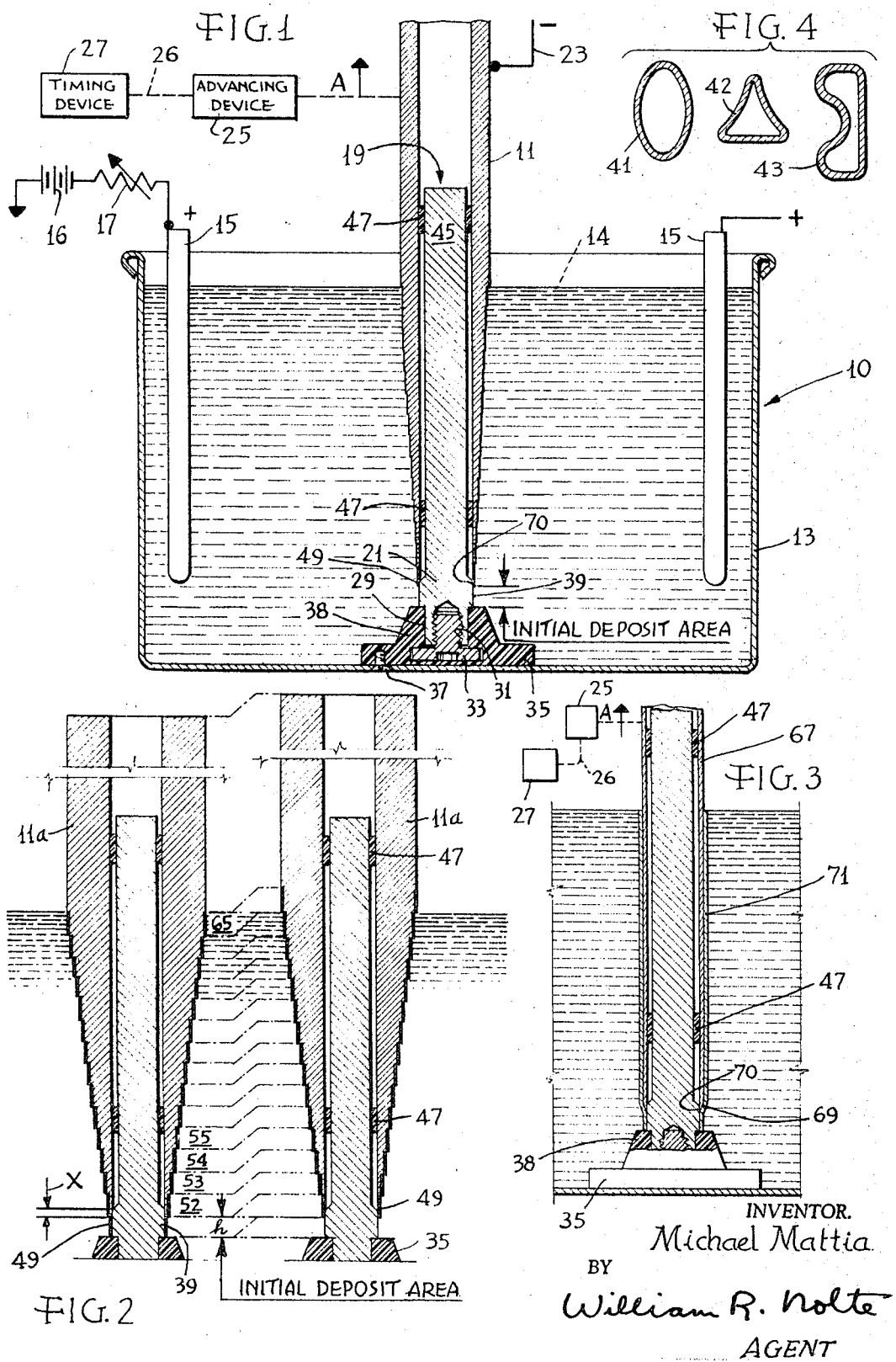

3,457,157
APPARATUS FOR PRODUCING TUBING
BY ELECTROFORMING
Michael Mattia, Upper Darby, Pa., assignor to The
Budd Company, Philadelphia, Pa., a corporation
of Pennsylvania
Filed July 26, 1966, Ser. No. 568,014
Int. Cl. C23b 7/02, 5/56
U.S. Cl. 204—208                                    5 Claims

ABSTRACT OF THE DISCLOSURE

An apparatus for electroforming tubing of a desired internal opening in a tank having a deposit solution. A mandrel having an external surface corresponding to the internal opening of the tube to be formed is mounted to the tank in the solution. Electric current means are provided to continually electrodeposit a material of the solution on the external surface. The material deposited assumes a tubular shape and is withdrawn from the mandrel at a rate commensurate with its growth.

---

This invention relates to a process and apparatus for producing tubing by electroforming, and more particularly, to a process and apparatus for producing simple and complex shaped tubing continuously of any desired length by electroforming on a permanent mandrel.

Heretofore tubing has been electroformed on various mandrel materials and the tubing has been forcibly stripped and removed from the mandrel. The disadvantages of this process is that it is necessary to first remove the mandrel having the tube deposited thereon from the bath and thereafter the tubing which is adhered to the mandrel must be forcibly removed from it. The finished length of the tubing so formed has been limited to the size of the tank holding the electroforming bath. Another method of making metal tubing has consisted in electrodepositing the desired metal on a suitable support such as silica, and thereafter removing the support from the tubing at a sufficiently high temperature to cause separation of the members due to differences in their thermal expansion rates. This also is a costly process, and the length of tubing formed is limited to the length of the mandrel. In numerous other processes involving expendable mandrels, a separate mandrel is required to be machined or otherwise formed for each length of tubing formed. After the tubing has been built up to the desired thickness the mandrel which may be of some suitable material, and having a lower melting point than the tube, is removed by melting the same. In other cases the mandrels are eaten out by acids, Obviously these processes are likewise very tedious, time consuming, and costly operations.

Accordingly, it is the principal object of this invention to provide an improved process and apparatus for continuously producing simple and complex shaped tubing of any desired length by electroforming on a permanent mandrel.

In accordance with this invention a tank is provided to support a mandrel of a material having the property of preventing adhesion of the deposit. The mandrel is prepared with a base portion having an exterior surface conforming to the interior opening in cross section of the desired tubing to be formed. An initial thin shell of material is electroformed on the exterior surface of the mandrel which is then moved axially relative to the mandrel. Thereafter, another thin shell of material is electrodeposited on the mandrel and the initial shell. The latter shell so formed and adhered to the initial shell are moved, also axially. In the same manner successive layers are each deposited on the mandrel and the preceding layer, and moved axially of the mandrel to permit deposition of a next successive layer in the same manner. This is continued until the desired thickness and length of tubing is secured.

For a better understanding of the present invention, together with other and further objects thereof, reference is had to the following description taken in connection with the accompanying drawing and its scope will be pointed out in the appended claims.

In the drawing FIG. 1 is a vertical section of the apparatus, partially schematic, in accordance with the invention for the continuous electrodeposition of metallic tubing.

FIG. 2 is a schematic vertical cross-sectional view showing the relationship between the axial advancement of the tubing and the electrodeposition of the successive layers forming the tubing.

FIG. 3 is a schematic elevational view partly in section showing the use of a starter to initially start the process of forming the tube.

FIG. 4 represents various cross sectional views of complex forms of tubing which may be formed by the apparatus of the present invention.

Referring to FIG. 1 of the drawing, there is shown electrodepositing apparatus 10, partially schematic, with a metallic hollow tube 11, being formed continuously and which may be of indeterminate length. The apparatus comprises a tank or vat 13 which contains a suitable electrolytic solution bath 14, which in the present instance may be a nickel sulfamate bath. Anodes 15, which in this case may be of depolarized nickel, are shown immersed in the solution and provided with a current source such as a battery 16 which includes means for varying the current flow therethrough as by a variable resistor 17. A mandrel 19 having the property of preventing adhesion, and in the present instance may be of stainless steel, and may be plated as by chrome or the like, is shown mounted in an upright position in the tank within the solution. Previously formed tubing 11, shown surrounding the mandrel, and making good electrical connection with the base portion 21 of mandrel 19 together constitute a cathode, and includes an electrical lead connection 23 shown making contact with the outer surface of the tube 11 and a suitable ground potential. Nickel electrodeposition techniques per se are known in the art, it being only necessary at this time to mention that extreme care is taken relative to both apparatus and procedure to insure the formation of the tubing 11 on the mandrel. Advancing means 25, which may be electromechanically actuated, makes contact with the upper portion of the tube 11 to advance the same incrementally upon receiving suitable signals from timing device 27. The latter is shown electrically connected to the advancing means 25 as by leads 26. The frequency of the signals from the timing device 27 may be such as to cause actuation of the advancing means at a rate so that continuous movement to the tube 11 is approached.

Extending beneath the base portion 21 of mandrel 19 there is a support portion 29 which is of less diameter than the base portion 21 and which is internally threaded as at 31 to receive an upright stud 33. The stud is housed within insulating member 35 which is suitably secured to the bottom of the tank as by screws 37. The upper portion of the insulating support member 38 forms a shoulder which projects outwardly at right angles to the exterior surface 39 of base portion 21. The threaded connection between the stud 33 and mandrel 19 enables mandrels of different cross section to be employed which in turn enable tubing of simple and complex form to be made in accordance with the process to be later described.

As seen in FIG. 4 such tubing may be oval as identified by reference character 41, triangular as at 42, or dumbbell shaped as at 43.

In order to provide guide means for the withdrawal of the tube 11 from the mandrel 19, the same is provided with an upper portion 45, which is coaxially aligned with but of less diameter than base portion 21. A plurality of spacer means 47, which may be ring-like in form, are supported on the projection 45. The outside diameter of the spacer means coincide with the outside diameter of base 21 and the inside diameter of tube 11 formed thereon. The spacer means assist in maintaining concentricity of the electrodeposited tube and prevent skewed movement relative thereto. This precludes cracking of the outermost layer 49, FIG. 2 of eletrodeposited material at the low end of tube 11 and which is adjacent to the base 21 of the mandrel.

In FIG. 2 there is shown a schematic arrangement in which electroformed tube 11a is shown in the process of formation on mandrel 19. The tube 11a is shown in slight overlapping engagement with base 21 of the mandrel an amount indicated by the distance X. The remaining height of the base 21 is indicated by the distance $h$. With the tube 11a in such position of overlap, a thin layer or shell of material 49 is deposited on the base 39 and about the outer periphery of the tube throughout its full extent of immersion in the liquor 14. The wall thickness of the layer 49 of tubing 11a is sufficient to enable it to be coaxially moved relative to the base 21 and through a distance $h$. The shifted position of the formed tubing as seen on the right hand side of the figure exposes base 21 for deposition of a new shell of material. It can be seen that the tube 11a has been stepped or advanced between positions 52 to 65 inclusive and that corresponding to each positon of step a layer of material is electrodeposited on the base of the mandrel 21 and on the tube 11a. The wall thickness of the tubing formed as a buildup of successive layers may be controlled by timing and advancing means 26, 27 and by the current density via battery 16 and variable resistor 17.

With reference now to FIG. 3, a starter sleeve 67 may be employed to initially start the operation prior to the introduction of liquor 14 containing the desired metal of which the tube 11 is to be formed. The lower end of the tube may be machined or otherwise formed to make a leakproof connection with the upper portion of base 21 of the mandrel so as to prevent the liquor from coming between the mandrel and the inside of the starter sleeve. The lower external periphery of the sleeve is gently tapered and slightly rounded at its bottom edge 69. The upper portion of base 21 may also be tapered as at 70 to provide relief when the sleeve and the layers of subsequently electrodeposited material are withdrawn vertically. Thereafter the liquor is introduced into the tank 13 and a first layer or coat 71 is electrodeposited on the exterior of the sleeve and on the base 21 of the mandrel. Since the lower end of the sleeve 47 is gently faired as at 69 sharp breaks and flaws in the formation of the layer 71 are precluded. The starter sleeve may be moved for example through successive steps 52 to 65 inclusive in the manner described with reference to FIGS. 1 and 2 until the desired overall wall thickness of tubing and length thereof is obtained; the starter sleeve being suitably removed when the same is clear of the bath. With the process so under way, the continuous production of tubing may be obtained.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. Apparatus for electroforming continuously tubing of a desired internal opening, comprising tank means adapted to contain an electrolyte solution, a mandrel mounted within said tank, said mandrel having a base portion with an external surface corresponding to the internal opening of the tube to be formed, said mandrel having an axial extension projecting from said base and including means for guiding the tubing formed on said base, said axial extension having its external surface set back radially inwardly from the external surface of said base portion and being free of physical contact with tubing on said base, current means for electroforming a thin shell of electrodeposited material on said base of said mandrel, and means for advancing said shell so formed relative to said base.

2. In the apparatus for electroforming tubing set forth in claim 1 wherein said means for advancing said shell includes a starter sleeve adapted to telescopically engage said mandrel to make a leak-proof connection with said external surface of said base portion to prevent passage of liquid deposit material between said sleeve and said axial extension of said mandrel.

3. In the apparatus for electroplating tubing as set forth in claim 2 and including guide means associated with said axial extension of said mandrel and the inner surface of said sleeve to confine movement of the latter axially of said mandrel.

4. In the apparatus for electroforming tubing set forth in claim 3 and including means for cooperative engagement with said starter sleeve for advancing the same a predetermined amount.

5. In the apparatus for electroforming tubing as set forth in claim 4 and including timing means for varying the interval during which said starter sleeve and the electroformed tubing deposited thereon is advanced relative to said mandrel.

References Cited

UNITED STATES PATENTS

| 1,071,036 | 8/1913 | Feldkamp | 204—9 |
| 2,061,554 | 11/1936 | Billiter | 204—209 |
| 2,358,232 | 9/1944 | Johnson | 204—9 |
| 2,540,175 | 2/1951 | Rosenquist | 204—13 |

JOHN H. MACK, Primary Examiner

T. TUFARIELLO, Assistant Examiner

U.S. Cl. X.R.

204—9, 13, 25